United States Patent [19]
Bablitzka

[11] 3,907,381
[45] Sept. 23, 1975

[54] PRESSURE-MEDIUM OPERATED RELAY VALVE FOR THE CONTROL OF BRAKES ON A VEHICLE

[75] Inventor: Adolf Bablitzka, Dachau, Germany
[73] Assignee: Knorr-Bremse GmbH, Munich, Germany
[22] Filed: Jan. 6, 1975
[21] Appl. No.: 538,932

[30] Foreign Application Priority Data
Jan. 25, 1974  Germany............................ 2403675

[52] U.S. Cl. ................................ 303/40; 303/21 F
[51] Int. Cl.² ...................... B60T 15/02; B60T 8/02
[58] Field of Search .......... 303/21 F, 29, 40, 50, 59, 303/60, 54

[56] References Cited
UNITED STATES PATENTS
| | | | |
|---|---|---|---|
| 3,456,991 | 7/1969 | Valentine et al. .................... | 303/29 |
| 3,545,818 | 12/1970 | Davis................................. | 303/21 F |
| 3,655,246 | 4/1972 | Keller................................. | 303/21 F |

*Primary Examiner*—Duane A. Reger
*Attorney, Agent, or Firm*—Edmund M. Jaskiewicz

[57] ABSTRACT

A relay valve has a housing in which is mounted a diaphragm piston to define on one side a valve chamber connected to the brake cylinder and on the other side a control chamber whose volume is relatively small with respect to the volume of the pressure-medium utilized by the brake cylinder. A double valve member has an outlet valve for disconnecting the valve chamber from the atmosphere through a valve seat on the diaphragm piston and has an inlet valve connected by a connecting pipe to the valve member of the outlet valve so as to close the valve chamber with respect to the chamber connected to a source of pressure-medium through a valve seat fixed in the housing. Extending from the diaphragm piston is a cylinder which traverses the control chamber and leads to the atmosphere. The inner end of the cylinder is closed on the valve chamber side by the outlet valve. The connecting pipe is guided in sealing relationship in a partial chamber which can be connected to the control chamber by a solenoid outlet valve and there is a nozzle in the connecting pipe which substantially reduces the cross-sectional flow area of the pipe.

5 Claims, 2 Drawing Figures

PRESSURE-MEDIUM OPERATED RELAY VALVE FOR THE CONTROL OF BRAKES ON A VEHICLE

The present invention relates to a pressure-medium operated relay valve for the electropneumatic control of brakes of vehicles, more particularly, to such a relay valve which has an extremely short response time.

It has been known to employ a pressure-medium operated relay valve having a relatively short response time in the electropneumatic control of brakes of vehicles. One such relay valve comprises a valve housing having a control chamber therein defined by a piston with said piston controlling an inlet and outlet valve for monitoring the action of pressure-medium in a valve chamber as a function of control pressure supplied into the control chamber. The valve chamber was connected to the device utilizing the pressure-medium, such as the brake cylinder. The inlet valve was built into a connection leading to a source of pressure medium and the control pressure was regulated by a solenoid inlet valve and a solenoid outlet valve. Such relay valves have been particularly employed for the electropneumatic protection against the locking of brake wheels of pressure-medium controlled brake systems of vehicles.

Since the locking of the wheels occurs very quickly such relay valves must be able to permit a very rapid control of pressure supplied to the brakes. It was therefore necessary to devise relay valves which were characterized by having extremely short response times.

In order to meet the requirement of a very short response time, relay valves have been constructed wherein the inlet and outlet valves have been combined into a double valve in which a spring-loaded shut-off element in its closed position blocks passage between the source of pressure-medium and the valve chamber which is connected with the device to employ the pressure-medium. The spring-loaded shut-off element at the same time functions as a valve seat for an axially displaceable hollow valve stem through which the valve chamber can be vented. The valve stem is connected to a piston which defines the valve chamber separately from and pressure-sealed with respect to the control chamber. When the control chamber and the piston on the control chamber side are acted upon by the pressure-medium, the valve stem being in contact with the shut-off element lifts the element from its valve seat which surrounds the through passage to the valve chamber so that the pressure-medium is able to flow from the souce of pressure-medium through the valve chamber and thus to the device utilizing the pressure-medium. The piston is simultaneously acted upon in the direction opposite to the control pressure while the device actuated by the pressure-medium is thus applied with the medium.

If a control device is connected preceding the relay valve to control the pressure-medium introduced to the device being actuated and if the control device is actuated so that the control chamber is evacuated through an electropneumatic valve, the pressure exerted by the pressure-medium in the device being actuated will act on the force of the piston away from the control chamber so as to move the piston and the valve stem connected thereto in a direction toward the control chamber. The movement in this direction will again position the shut-off element on its seat under the action of a spring loading the shut-off element and as a result the hollow valve stem will be lifted from the shut-off element. This will cause the pressure-medium to flow from the device being actuated and the result will be that the device will either function at a lower level or will not function at all. Such an operation might be desirable where a defect in the operational sequence of a device associated with the control device may occur which might lead to damage of the device or risk of an accident if the effective or working force of the pressure-medium introduced to the device remains constant. There may be only a very brief time interval between a signal indicating a defect and a decrease or reduction in the operation of the device actuated by the pressure-medium. This means that the control device and the relay valve may each have a very short time intervals between changes in their operating states.

Tests have shown that the required short switching times cannot possibly be obtained with the relay valves known to date. This is true because during the switching of the relay valve from one state to the other the piston must move a relatively long distance which consists of the sum of the displacement of the inlet valve to the closing position and the displacement of the outlet valve to the opening position. Further, at that instant when the shut-off element engages its valve seat on the inlet valve, a sudden change in the load on the piston will occur because the force of the spring loading the shut-off element becomes ineffective at that instant. There will thus occur a distinct bend or irregularity in a curve defining the movement of the piston and as a result there is a delay in the switching operation.

The use of a weaker valve spring which would produce a smaller load of the piston would not produce a faster switching time since under these circumstances the shut-off element would not be able to follow immediately the movement of the piston and the hollow valve stem. Thus, for an instant the inlet and the outlet valve will be open simultaneously and because of the additional supply of pressure-medium from its source, the pressure-medium cannot be rapidly evacuated from the device from which it is desired to vent the pressure-medium.

In order to overcome the abovementioned disadvantages it has been proposed to provide a relay valve having two diaphragm pistons that are coupled to each other and jointly enclose a control chamber. When a pressure-medium is introduced into a control chamber, the diaphragm pistons are moved apart such that one piston opens the shut-off element of the outlet valve and the other operates at the same time to close the shut-off element of the inlet valve so that a sudden and abrupt evacuation of pressure-medium from the device being actuated is obtained. Although this relay valve having two diaphragm pistons does provide an optimum reduction of the response time it has the disadvantage that the structure includes two diaphragm pistons. The relay valve is thus quite complicated in structure and requires expensive manufacturing operations. Further, the relay valve is difficult to adjust.

It is therefore the principal object of the present invention to provide a pressure-medium operated relay valve of the type described above which has an extremely short switching time even when used in connection with electronic control devices.

It is a further object of the present invention to provide such a relay valve which is simple in structure, reliable in operation, can be installed at a minimum of expense and can be manufactured at a relatively low cost.

According to one aspect of the present invention, a pressure-medium operated relay valve particularly for the electropneumatic control of brakes of a vehicle may comprise a valve housing having a diaphragm therein defining on one side thereof a control chamber and on the other side thereof a valve chamber connected to a brake cylinder. Also within the housing is a first chamber which is connected to a source of pressure-medium and communicates with the control chamber. A double valve has a first valve member which is engageable with the valve chamber side of the diaphragm piston to define an outlet valve between the valve chamber and the atmosphere and a second valve member engageable with a portion of the housing to define an inlet valve between the first chamber and the valve chamber. The double valve is provided with a hollow stem interconnecting both valve members and there is a nozzle in the stem so as to reduce the cross-section of the flow passage therein and opening to the atmosphere. The diaphragm piston has a centrally mounted cylinder which passes through the control chamber and opens to the atmosphere. Also within the housing is a second chamber located such that one end of the double valve member hollow stem is slidably mounted in this second chamber and communicates with the chamber. A normally closed solenoid valve means is provided within the housing to connect the second chamber and the control chamber when opened so that the pressure in the control chamber is lowered and the pressure in the second chamber increases so as to close the second valve and the first valve opens to vent the valve chamber as the pressure in the control chamber decreases.

The relay valve according to the present invention not only has the advantage of having a very short response or switching time but has the further advantage in that the single diaphragm provides for a decreased displacement of the piston during switching. When there is a sudden change of pressure in the control chamber such as would occur at the start of venting of the device, an accumulated pressure which would form in front of the nozzle can be employed for switching the inlet and outlet valves which will thus occur simultaneously so that the control spring which loads the inlet valve may be relatively small in force.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment of the present invention will be described in detail.

Figure 1:
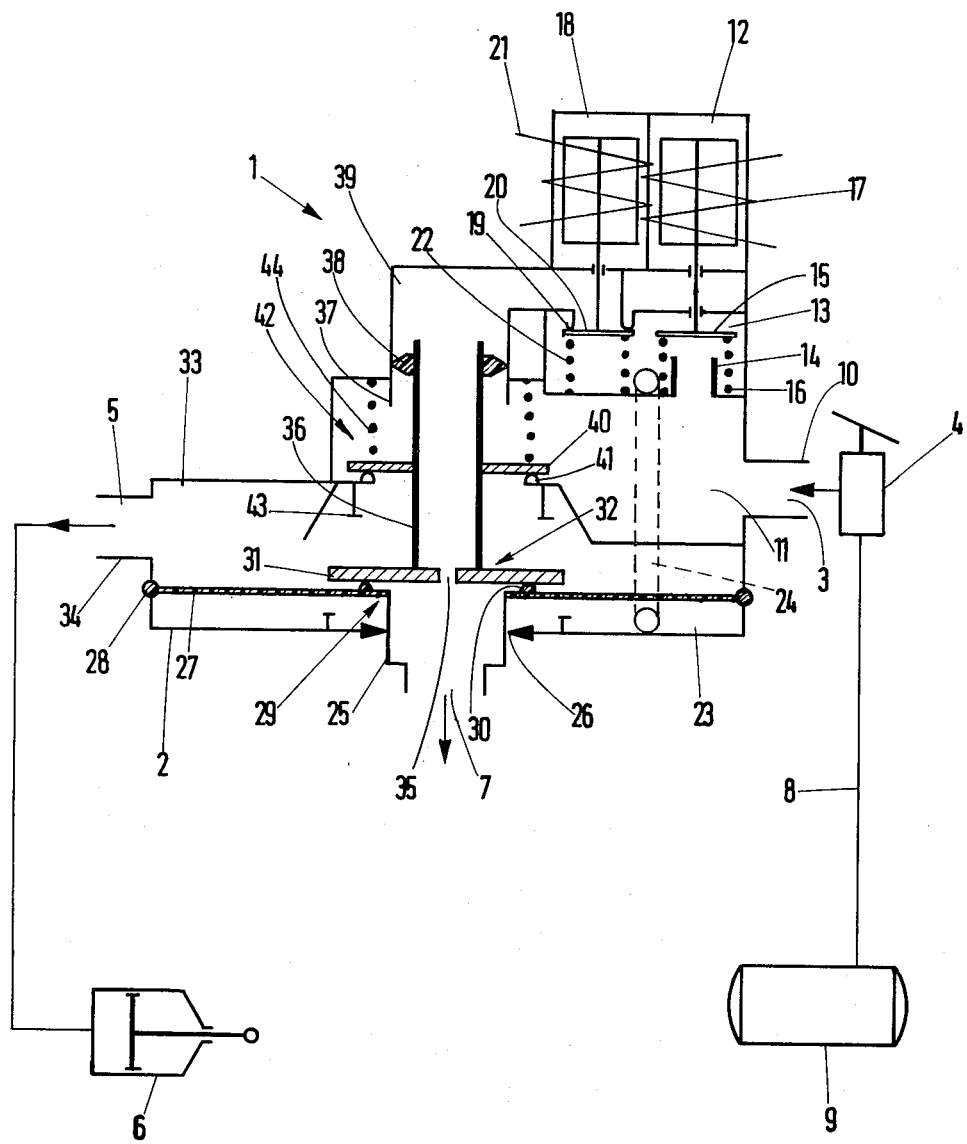
FIG. 1 is a schematic representation of a relay valve according to the present invention as employed in a brake system operated by a pressure-medium and in conjunction with an anti-wheel locking device.

As may be seen in FIG. 1, a relay valve according to the present invention is indicated generally at 1 and is mounted in a housing 2 which is connected through a compressed air connection 3 to a motor vehicle brake valve 4 and through a second compressed air connection 5 to a brake cylinder 6. The housing has an outlet 7 which opens to the atmosphere. The brake valve 4 is connected through pipe 8 to a source of pressure-medium 9.

The compressed air connection 3 is connected through a pipe 10 to a chamber 11 located within the housing 2 and then through a solenoid inlet valve 12 to a servo control chamber 13. The solenoid inlet valve 12 has a valve seat 14 fixed to a portion of the housing which is engageable by a disk-shaped valve member 15 which is urged into the open position under the action of a spring 16. The solenoid valve 12 further comprises a winding 17 which when unenergized retains the valve member 15 in the open position as shown. A solenoid outlet valve 18 is also provided on the servo control chamber 13 and comprises a valve seat 19 similarly fixed to the housing and a disk-shaped valve member 20 which is retained in the closed position on valve seat 19 under the action of a spring 22 when its winding 21 is unenergized.

The solenoid inlet valve 12 which regulates the control pressure in the solenoid outlet valve 18 can be used jointly as an anti-wheel-locking device or blocking protection device as known in the art. Should the winding 17, 21 become energized because of a signal transmitted in response to an excessive locking of the wheels during a braking operation, the normally open passage 14, 15 of solenoid inlet valve 12 from chamber 11 to servo control chamber 13 will be disconnected and at the same time the normally closed passage 19, 20 of a solenoid outlet valve 18 will be opened. The servo control chamber 13 and the control chamber 23 of relay valve 1 will be then vented to the atmosphere through outlet 7 and the brake cylinder 6 is thus also subjected to a decrease in pressure whereupon the brake of the locked wheel is released.

In the normal condition and when the windings 17 and 21 are unenergized the chamber 11 which is acted upon by pressure regulated through the brake valve 4 is connected to the control chamber 23 through solenoid inlet valve 12, servo control chamber 13 by means of an air passage or duct 24. A hollow open-ended cylinder 25 traverses the control chamber 23 so as to be slidably displaceable therethrough and projects centrally through housing 2. The cylinder 25 is guided for axial displacement in a bearing 26 mounted on the housing 2 and its lower end opens to the atmosphere through the outlet 7. The upper edge of cylinder 25 is secured by means of a pressure-tight seal to an elastic diaphragm 27 the outer edges of which are securely fastened at 28 to the housing 2 so as to enclose the control chamber 23.

The cylinder 25 together with the elastic diaphragm 27 forms a diaphragm piston 29 which is provided with a valve seat 30 in its upper surface which is directed away from the control chamber 23. A disk-shaped valve member 31 is engageable with the valve seat 30 to form an outlet valve 32 which when closed in sealing relationship with the valve seat will define a valve chamber 33 which is connected through the connection 5 and a pipe 34 to the brake cylinder 6.

In order to increase the speed of venting of the valve chamber 33 through outlet valve 32 during a switching operation, a nozzle 35 is located centrally in the plane of the disk-shaped valve member 31 of the outlet valve 32 within a connecting pipe 36 the lower end of which is securely fastened to the upper surface of the valve disk 31. The connecting pipe 36 is guided in sealed relationship by a packing ring 38 for axial displacement within a cylinder 37 within the housing 2 with the upper end of the pipe 36 opening into a subchamber 39 which may be connected to the control chamber 23 through the solenoid outlet valve 18. Thus, the subchamber 39 is connected to the atmosphere through outlet 7 and the nozzle 35 which considerably reduces the cross-sectional area of the flow passage through the connecting pipe 36.

Below the subchamber 39 and within the chamber 11 there is a disk-shaped valve member 40 securely fastened to the connecting pipe 39 and engageable with a valve seat 41 formed on a partition wall of housing 2 to form an inlet valve 42 which is able to sealingly close off chamber 11 with respect to the valve chamber 33.

The valve members 31 and 40 on the connecting pipe 36 form jointly a double valve 31, 40 which is limited in its opening stroke by means of an abutment 43 located in the valve chamber 33 and mounted on a portion of the housing 2.

In the chamber 11 there is a compression spring 44 which loads the valve member 40 into the closed position. The force of the compression spring 44 may be relatively small in view of the sudden pressure increase that occurs for a short duration of time above the nozzle 35 and accelerates the closing of the double valve member 31, 40.

The relay valve 1 is shown in FIG. 1 in its normal or rest position in which it is ready for operation. In this condition, the brake valve 4 is closed and the chamber 11 without any pressure-medium therein communicates through the slightly open valve member 15 of solenoid valve 12 with the servo control chamber 13 which is closed by the valve member 20 of the solenoid valve 18, through the passage 24 and with the control chamber 23. The double valve members 31, 40 are positioned on their valve seats 30, 41 respectively and valve chamber 33 together with brake cylinder 6 as well as the subchamber 39 are not subjected to any pressure by a pressure-medium.

When a normal braking operation is initiated, the brake valve 4 is actuated to supply a pressure-medium from source 9 through pipe 8, through brake valve 4 and connection 10 into the chamber 11 at a pressure which is proportional to the braking stage as determined by the driver by his degree of actuation of the brake valve 4. The pressure-medium flows through solenoid valve 12, servo control chamber 13 and through passsage 24 into control chamber 33 so that the diaphragm piston 29 is raised in the direction of the valve chamber 33. The upward movement of diaphragm piston 29 causes the double valve member 31, 40 to also move upwardly and while the outlet valve 32 remains closed the valve member 40 of inlet valve member 42 will be raised from its valve seat so that inlet valve 42 is opened to a position corresponding to the predetermined braking stage. The opening stroke of the inlet valve 42 is thus set automatically to the required magnitude of the brake cylinder pressure.

Through the open inlet valve 42, the pressure-medium then flows into valve chamber 33 and through pipe 34 into brake cylinder 6 to apply a braking force on the wheel of the vehicle associated with the brake cylinder 6 but not shown in the drawings. The brake cylinder pressure in valve chamber on the acts onthe diaphragm piston 29 in a direction opposite to that of the control pressure in control chamber 23 so that an equilibrium of forces is established on the diaphragm piston 29. The compression spring 44 urges the diaphragm piston 29 downwardly toward control chamber 23 until inlet valve 42 is again closed. The normal braking operation is thus completed.

As the brake of the vehicle is released, the pressure-medium in control chamber 23 is vented through passage 24, servo control chamber 13, solenoid valve 12, chamber 11, pipe connection 10 and through brake valve 4. At the same time, the diaphragm piston 29 is displaced downwardly toward outlet 7 because of the decrease of pressure in control chamber 33. As a result, valve seat 30 is separated from valve member 31 of outlet valve 32 and the brake cylinder 6 is now vented to the atmosphere through pipe 34, valve chamber 33 and outlet 7 until the pressure is again equalized between the valve chamber 33 and the control chamber 23. As a result of this equalization of forces on the diaphragm piston 29, the piston 29 will again be shifted back to its initial or rest position because of the resiliency of the extended diaphragm 27 until the valve seat 30 contacts valve member 31 of the outlet valve 32. The release operation of the vehicle brake is now completed and the relay valve 1 is again in its normal or rest position as shown in FIG. 1.

If the braking force applied to the braked vehicle wheel is excessive such that locking of the wheel may occur during a normal braking operation as described above, a device as known in the art would generate a signal to energize windings 17 and 21 of the solenoid valves 12 and 18. Energization of coil 17 of valve 12 will close valve member 13 against valve seat 14 so as to disconnect the chamber 11, in which is introduced a pressure-medium from the servo control chamber 13. Concurrently therewith, the energization of outlet valve 18 will lift the valve member 20 from its valve seat 19 to connect the control chamber 23 through passage 24 to the subchamber 39. As the pressure in control chamber 23 begins to decrease there is propagated a pressure wave at a high velocity and there is a pressure surge or increase in the subchamber 39 above nozzle 35. This pressure increase suddenly loads the double valve 31, 40 in the closing direction until valve member 40 of inlet valve 42 contacts its valve seat 41 to close chamber 11 with respect to the valve chamber 33. The central portion of the diaphragm 27 is also strongly accelerated in the direction of movement toward control chamber 23. Because of this acceleration of diaphragm 27 and the presence of the brake cylinder pressure still remaining in chamber 33 and because of the decrease in pressure in control chamber 23, the diaphragm piston 29 is separated from the valve seat 30 which enables the brake cylinder 6 to be Vented to the atmosphere through pipe 34, valve chamber 33, outlet valve 32 and outlet 7.

The pressure surge or accumulation prevailing above nozzle 35 is gradually deduced to atmospheric pressure through outlet 7. The pressure-medium flowing out of the nozzle 35 accelerates venting of the valve chamber 33 by means of the jetpump effect. Accordingly, the pressure-medium discharged to the atmosphere from brake cylinder 6 through outlet valve 32 and outlet 7 is accelerated and brake cylinder 6 is thus vented at an even faster rate. As a result, the brake is released at least partially and excessive retardation or braking of the vehicle wheels is ended.

If the decrease in pressure in brake cylinder 6 again accelerates the vehicle wheel, solenoid inlet valve 12 and solenoid outlet valve 18 are again switched over so that chamber 11, which was continuously under pressure during the abovedescribed excess braking of the wheel, now supplies pressure medium into control chamber 23 through the open solenoid valve 12, servo control chamber 13 and the passage 24. The supply of pressure medium into the control chamber 23 causes an increase in pressure thereof and shifts the diaphragm piston 29 upwardly toward valve chamber 33 until diaphragm 27 engages valve seat 30 on valve member 31 and closes the valve chamber 33 with respect to the atmosphere. Because of the pressure continuing in control chamber 23, the diaphragm piston 29 will be further displaced upwardly to move the double valve 31, 40 upwardly until valve member 40 of the inlet valve 42 is lifted from its valve seat 41. The opening of inlet valve 42 will enable the pressure medium to flow from chamber 11 into valve chamber 33 and through pipe 34 into brake cylinder 6 until the pressure is equalized between control chamber 23, valve chamber 33 and the chamber 11. The equalization of pressure will establish a simultaneous equilibrium of forces acting upon the diaphragm piston 29. This new step of pressurizing the brake cylinder 6 is now completed.

During any further excessive braking of the vehicle wheel the procedure as described above would be repeated. When there is no longer any tendency for the vehicle wheel to lock, the diaphragm piston 29 will be moved again downwardly toward control chamber 23 as a result of the equilibrium of forces and because of the elasticity of diaphragm 27 until the diaphragm piston 29 assumes its original position. The force exerted by compression spring 44 on the valve member 40 of inlet valve 42 causes the double valve 31, 40 to follow this downward movement of the diaphragm piston 29 until the valve member 40 contacts valve seat 41.

If the applied braking stage is too strong or if decreased braking is required, the pressure is lowered by decreasing the pressure in chamber 11 in response to actuation of brake valve 4. The pressure will thus be also decreased in control chamber 23 through passage 24, servo control chamber 13, solenoid inlet valve 12 and chamber 11. The decrease in pressure in control chamber 23 will cause the diaphragm piston 29 to be moved downwardly toward control chamber 23 because of the prevailing higher pressure in valve chamber 33. The diaphragm 27 would thus be lifted from its valve seat 30 and brake cylinder 6 will be vented to the atmosphere through outlet 7 until the brake cylinder pressure is reduced corresponding to the magnitude of the decrease in the braking stage. After the equalization of pressure on both sides of diaphragm 27 brings about an equilibrium of forces, the diaphragm piston 29 will be returned to its initial normal position because of its inherent elasticity of diaphragm 27. As a result, the outlet valve 32 will again be closed. A vehicle wheel is now braked with a reduced braking power and the application of a lower braking stage is thus completed.

The subsequent release of the brake is accomplished as described above. It should be noted that the flow of compressed air through the valves 32 and 42 when they are open is such that this flow of air exerts a component of force acting to close the valves. Together with a suitable dimensioning of these valves, this force component permits one to use a spring 44 which is relatively weak in structure, and, the valve structure may be so constructed that this spring may even be completely eliminated.

Figure 2:
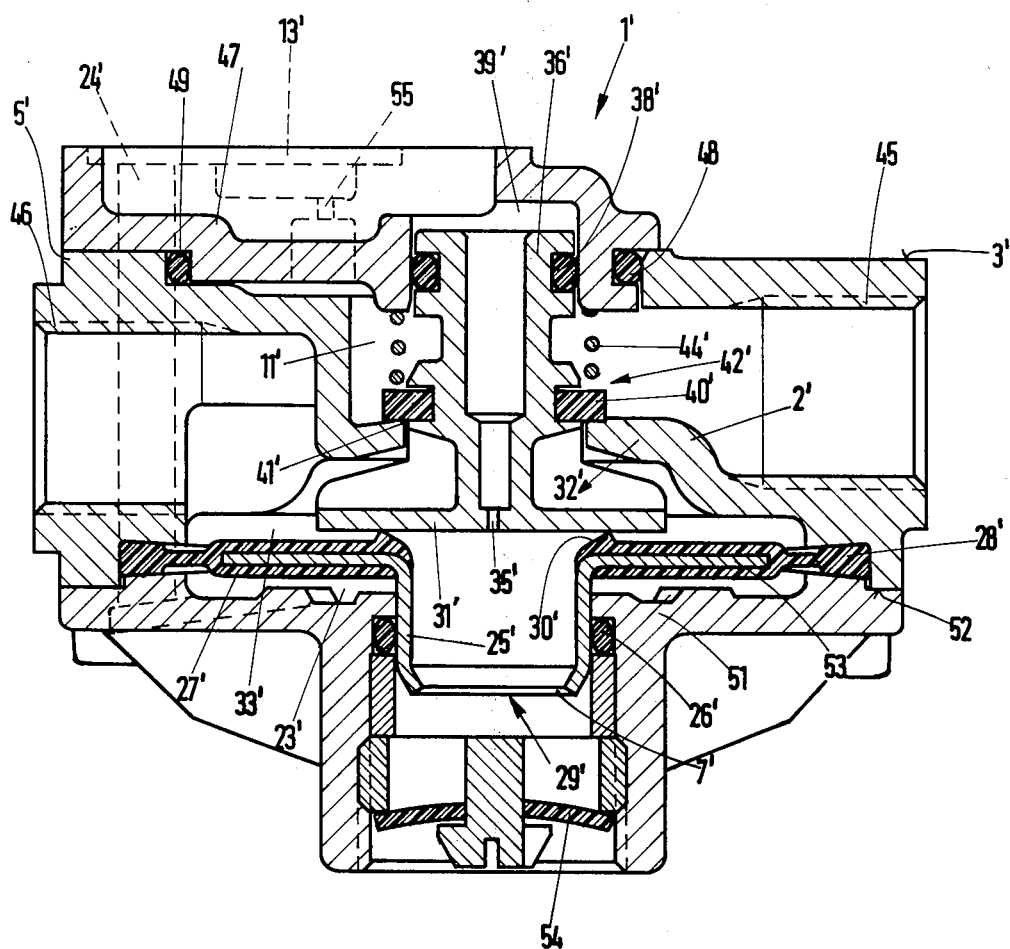
FIG. 2 is a sectional view through the relay valve of the present invention.

The structural details of a relay valve in accordance with the present invention are shown in FIG. 2 and the components thereof similar to those of the schematic representation of the valve in FIG. 1 are designated by the same reference numerals but with a prime ('). A relay valve 1' is mounted in a housing comprising a central portion 2' on one side of which is a pipe connection 3' having an internal thread 45 suitable for connection to a motor vehicle brake valve which is not shown in the drawing. On the opposite side of central housing portion 2' is a pipe connection 5' having its axis parallel to the pipe connection 3'. The pipe connection 5' is provided with internal threads 46 for connection to a brake cylinder which is not shown in the drawings.

A flange 47 is rigidly connected to pipe connection 5' on the upper side thereof. A solenoid inlet and solenoid outlet valve which is not shown in this drawing are mounted on the flange 47. A flange 47 is connected by means of a pressure-tight packing 48, 49 to housing portion 2' which carries the pipe connections 3' and 5'. In the flange 47 there is provided a cylindrical bore 37' so as to be disposed axially in the central portion of the relay valve 1'. A double valve 31', 40' is guided for displacement in the bore 37 and pressure sealed therein by a packing 38' and movable against the force of a compression spring 44' resting on the lower surface of the flange 47.

The double valve 31', 40' is rigidly connected to a connecting pipe 36' the lower end of which is provided with a nozzle 35' located in the valve member 31'.

A flange 51 is mounted on the lower side of relay valve 1' and has an outer edge 52 which is rigidly connected to the housing portion 2'. A flexible and resilient diaphragm 27' has its outer edge 28' firmly clamped at the outer edge connection 52 and is reinforced. The diaphragm 27' is reinforced by a metal insert 53 the inner portion of which forms a cylinder 25' which is guided by axial displacement by means of a packing 26' and together with diaphragm 27' forms a diaphragm piston 29'. An outlet 7' is connected to the atmosphere through a diaphragm valve 54 which prevents the admission of foreign matter such as dirt and the like. A valve seat 30' is provided on the upper surface of diaphragm 27' to coact with valve disk 31' to form an outlet valve 32'. A valve seat 41' rigidly mounted on the valve housing coacts with valve disk 40' which comprises a clip-on packing ring to form an inlet valve 42'.

A servo control chamber 13' is connected to a control chamber 23' through an air passage 24' and can be disconnected from a subchamber 39' and be tightly sealed therefrom by means of the solenoid outlet valve. The solenoid inlet valve mounted in servo control chamber 13' is connected through an inlet 55 to a chamber 11' and through pipe connection 3' to the motor vehicle brake valve. A valve chamber 33' is connected through pipe connection 5' to a brake cylinder such as 6 in FIG. 1.

The operation and function of relay valve 1' as shown in FIG. 2 corresponds to that of relay valve 1 illustrated in FIG. 1.

It may be seen that the relay valve 1' is preferably provided with a control chamber 23' and valve chamber 33' both of which have a relatively small volume.

The structure of the individual components of relay valve 1' is thus such that the assembly thereof can be performed in a simple procedure without time consuming assembly operations. As a result, such a relay valve can be manufactured at a relatively low cost.

While the operation of relay valve 1 or 1' has been described employing compressed air as the pressure-medium it is to be understood that these relay valves can be employed in systems that operate pneumatically or hydraulically. It should be further noted that solenoid valves 12 and 18 may also be regulated through preferably electronic brake control devices instead of being monitored through anti-locking switching devices. Inlet connections 3 or 3' would therefore not be connected directly to a motor vehicle brake valve 4 but to a source of compressed air that continuously supplies compressed air and possibly utilizing a pressure-limiting device set to the maximum pressure of the brake cylinder.

In addition to be employed in brake systems as disclosed herein, relay valves 1 and 1' of the present invention may be employed in any control and regulation installation that requires extremely short and quick switching times in order to achieve proper control and regulation.

It will be understood that this invention is susceptible to modification in order to adapt it to different usages and conditions, and accordingly, it is desired to comprehend such modifications within this invention as may fall within the scope of appended claims.

What is claimed is:

1. A pressure-medium operated relay valve for the electropneumatic control of brakes of a vehicle comprising a valve housing having a diaphragm piston therein defining on one side thereof a control chamber and on the other side thereof a valve chamber connected to a brake cylinder, means in said housing defining a first chamber therein connected to a source of pressure-medium and communicating with said control chamber, a double valve having a first valve member engageable with said other side of said diaphragm piston to define an outlet valve between said valve chamber and the atmosphere and a second valve member engageable with a portion of said housing to define an inlet valve between said first chamber and said valve chamber, said double valve having a hollow rod interconnecting said first and second valve members, a nozzle in said double valve member hollow rod reducing the cross-sectional area therein and opening to the atmosphere, a cylinder centrally mounted on said diaphragm piston to traverse said control chamber and opening to the atmosphere, means in said housing defining a second chamber therein and one end of said double valve hollow rod being slidably mounted in said second chamber and communicating therewith, a normally closed solenoid valve means within said housing for connecting said second chamber and said control chamber when opened such that the pressure in the control chamber is lowered and the pressure in said second chamber increases to close said second valve and said first valve opening to vent the valve chamber as the pressure in the control chamber decreases.

2. A pressure-medium operated relay valve as claimed in claim 1 wherein said nozzle is disposed in the plane of said first valve member.

3. A pressure-medium operated relay valve as claimed in claim 1 and a normally open second solenoid valve means between said first chamber and said control chamber.

4. A pressure-medium operated relay valve as claimed in claim 3 and means within said housing defining a servo control chamber between said first chamber and said second chamber, said second solenoid valve means being between said servo control chamber and said first chamber and said first solenoid valve means between said first chamber and said servo control chamber, and passage means interconnecting said servo control chamber and said control chamber.

5. A pressure-medium operated relay valve as claimed in claim 3 and a vehicle brake valve connected to said first chamber to regulate the pressure therein.

* * * * *